United States Patent [19]
Schmidt

[11] Patent Number: 5,383,720
[45] Date of Patent: Jan. 24, 1995

[54] BRAKING SYSTEM FOR MOTOR VEHICLES

[75] Inventor: Guenther Schmidt, Tamm-Hohenstange, Germany

[73] Assignee: Robert Bosch GmbH, Stuttgart, Germany

[21] Appl. No.: 127,037

[22] Filed: Sep. 24, 1993

[30] Foreign Application Priority Data

Dec. 17, 1992 [DE] Germany .................... 4242732

[51] Int. Cl.⁶ .................................................. B60T 8/28
[52] U.S. Cl. ................................. 303/113.5; 303/9.62
[58] Field of Search ............... 303/9.62, 9.71, 9.73, 303/9.75, 9.63, 92, 20, 113.5, 113.1, 113.2, 119.1, 119.2, 90 D; 180/197

[56] References Cited

U.S. PATENT DOCUMENTS

| 4,982,999 | 1/1991 | Rossigno et al. | 303/9.75 X |
| 5,302,007 | 4/1994 | Morita et al. | 303/9.73 |

FOREIGN PATENT DOCUMENTS 2140112 12/1986 United Kingdom .

Primary Examiner—Robert J. Oberleitner
Assistant Examiner—Alfred Muratori
Attorney, Agent, or Firm—Edwin E. Greigg; Ronald E. Greigg

[57] ABSTRACT

A dual-circuit braking system for motor vehicles with an anti-locking device and optionally traction control, which is equipped with at least one pressure reducer for the brake pressure in the front-axle brake cylinders. With normal braking this pressure reducer is activated and the brake pressure on the front wheels is reduced. In the case of anti-locking, the pressure reducer is deactivated. However, with a defect in the electrical system or the anti-locking device, the pressure reducer is deactivated, and braking occurs at the front and rear such that vehicle deceleration of 0.82 G blocks the front wheels before the rear wheels.

20 Claims, 5 Drawing Sheets

BRAKING SYSTEM FOR MOTOR VEHICLES

BACKGROUND OF THE INVENTION

The invention relates to a braking system for motor vehicles as defined hereinafter. A dual-circuit braking system of this type is known from British Patent GB-PS 2 140 112 B.

A condition underlying the invention, mentioned in ECE Rule 13 and in specification 71/320/EWG, is that the design of the front-wheel brakes and the rear-wheel brakes must be selected such that the front wheels must block before the rear wheels, even with an empty vehicle, up to a vehicle deceleration of 0.82 G. It is intended by this that the vehicle remains directionally stable with increasing deceleration until blockage occurs, i.e., does not skid. When an automatic anti-locking device (ABS) is installed, it also applies with ABS valves in the initial position, for example, in case of a failure of the electrical system or a defect in the ABS control device, for instance.

In GB 2 140 112 B, which was mentioned at the outset, it is disclosed as known to improve the utilization of the braking force of the rear axle brakes by using so-called brake pressure regulators that control the brake pressure for the rear axle, dependent upon pressure, deceleration or load, as a function of the brake pressure on the front axle. Because this known design operates relatively inaccurately, however, GB 2 140 112 B proposes to execute a variable brake adjustment between the front and rear wheels, without additional brake pressure regulators, by means of the magnet valves of the anti-locking system that are present anyway. Such a braking adjustment permits a better utilization of the rear-axle brakes in the partial braking region, and uniform wear of the front- and rear-wheel brakes is thereby attained.

In this case pressure transducers are used as actual value transmitters, and quadripoles with transmission functions and comparators are used. Such pressure transducers are relatively expensive, yet they have zero-point defects and may produce varying ratios between charging pressure and electrical output voltage. The quadripoles also can have tolerances such that different front-wheel brake pressures result on the right and left. As an example, the characteristic curves of two quadripoles can have unequal curves.

OBJECT AND SUMMARY OF THE INVENTION

The object of the invention is to avoid these disadvantages and create a dual-circuit braking system of the type mentioned at the outset that requires less expenditure, and with which brake pressure uniformity is intended to be attained on the right and left of the vehicle by means of manufacture of two hydraulically chargeable active areas that is precise and simple per se.

Furthermore, it is intended, by means of the dual-circuit braking system of the invention, to attain the object, that during use of blocking and during failure of the anti-locking system the front wheels are braked sufficiently hard to maintain longitudinal stability of the vehicle, but that during normal braking the pressure reduction is activated only for the front wheels, and the rear axle is braked relatively harder.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
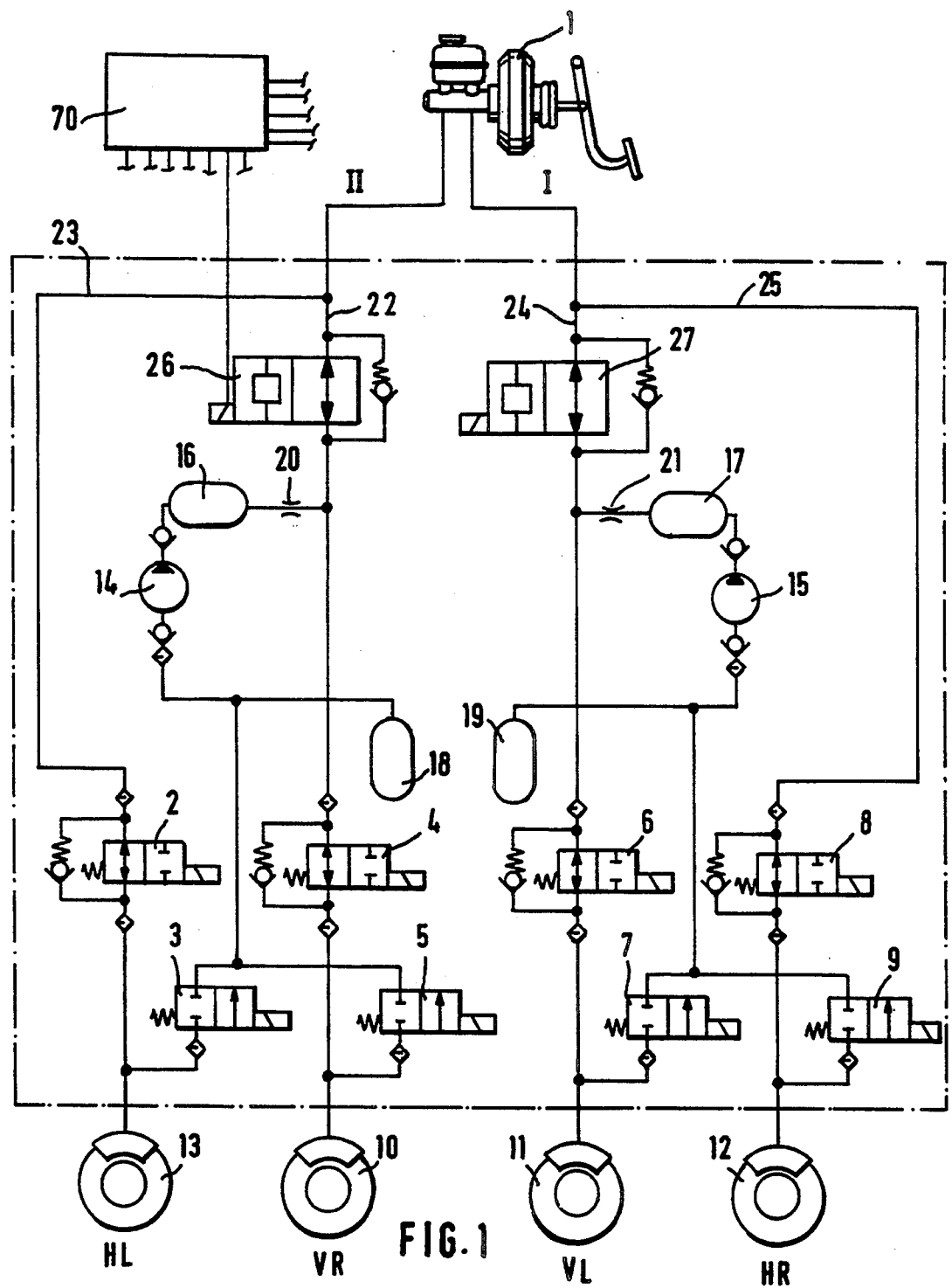
FIG. 1 shows a first exemplary embodiment of a dual-circuit braking system protected against locking, and the installation of a respective pressure reducer of the invention for each brake circuit.

The dual-circuit braking system shown in FIG. 1 is equipped with diagonal brake circuit division of its two brake circuits I and II. It has a main brake cylinder 1 and an anti-locking device, of which only the magnet valves, namely one pair each of inlet and outlet valves 2,3; 4,5; 6,7; and 8,9 are shown, downstream of which a wheel brake cylinder 10, 11, 12 and 13 is disposed for each vehicle wheel. The anti-locking device also has return pump 14, 15 for each brake circuit I or II, a hydraulic damping chamber 16, 17 with throttle points 20, 21, and a low-pressure reservoir 18, 19. Each brake circuit I and II branches off into two brake lines 22, 23 and 24, 25, of which the one (22, 24) respectively leads to the brake cylinders 10 and 11 of the front wheels, and the other (23, 25) respectively leads to the brake cylinders 12 and 13 of the rear wheels.

In accordance with the invention, a pressure reducer 26, 27 is now inserted into each of the two brake lines 22 and 24 that lead to the front wheels. Each pressure reducer 26, 27 is embodied based on a 2/2-way magnet valve and, in its currentless initial position, has a free throughput for the brake line 22, 24. In its other, magnet-operated position, it reduces the pressure so that an output pressure is lower in relation to the input pressure.

Figure 4:
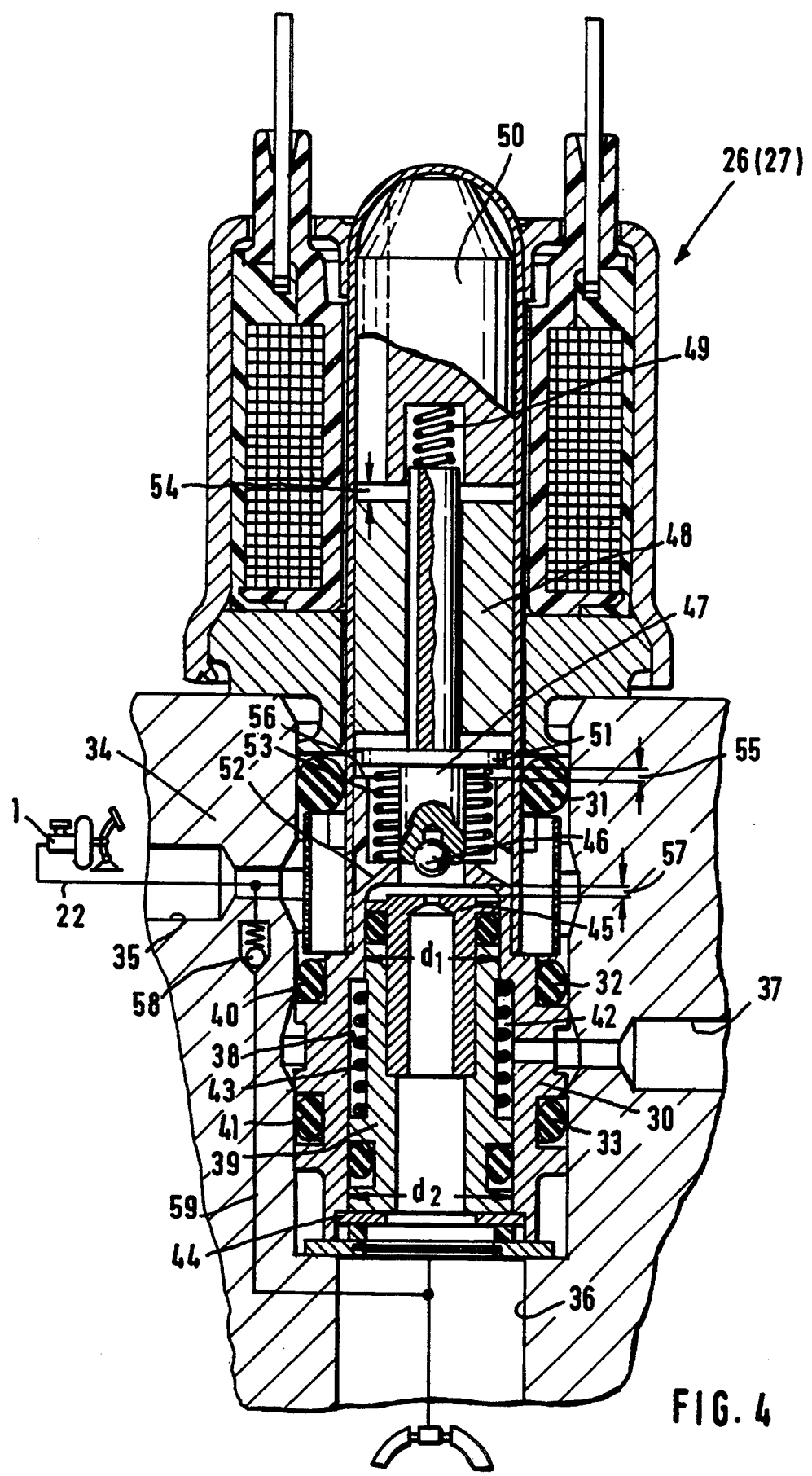
FIG. 4 is a sectional representation of a pressure reducer that can be switched in electrically.

These conditions become the most clear upon viewing FIG. 4, which shows a pressure reducer 26, 27 in section. It has a cylindrical housing 30, in whose casing surface three sealing rings 31, 32, 33 are embedded to permit the insertion of the housing 30 sealingly into a receiving housing 34, which is not shown in detail. The receiving housing 34 has three connections 35, 36 and 37, of which the connection 35 communicates with the main cylinder 1 via the brake line 22, 24, the connection 36 communicates with the front-wheel brake cylinder 10, 11, and the connection 37 communicates with the outside air.

The housing 30 is provided with a stepped bore 38, into which a hollow stepped piston 39 is inserted. The stepped piston 39 is sealed in the stepped bore 38 by means of two sealing rings 40 and 41. The ruling active surface on the one side of the stepped piston 39 bears the reference d1; the one on the other side bears the reference d2. The active surface d2 is larger than active surface d1. An annular surface between the two active surfaces d1 and d2 is non-operational, because it communicates with the outside air connection 37. Through the use of a pressure reducer 26, 27 for each vehicle side, the active surfaces d1 and d2 can be produced with simple mechanical means, and to a great extent isometrically, so that both pressure reducers also operate uniformly.

A coil pressure spring 43, which tries to press the stepped piston 39 downwardly against a stop ring 44, is disposed in an outside air chamber 42 limited by the annular surface. A valve seat 45 is inserted sealingly into an upper end of the hollow stepped piston 39. A ball closing body 46 is associated with the valve seat 45. The valve seat 45 and the closing body 46 form a seat valve 45/46 of the pressure reducer 26, 27. The ball closure body 46 is inserted into a lower end of a cylindrical valve tappet 47 that is disposed to be axially movable in a stationary, hollow, cylindrical flow guide member 48, and can be activated with the interposition of a pressure spring 49 of a magnet tension rod 50. A pressure spring 53 is also disposed between a shoulder 51 of the valve tappet 47 and a shoulder 52 of the stepped bore 38. Together with the active surfaces d1 and d2, they act on the switching function of the pressure reducer 26, 27.

Finally, different gaps also affect the switching function of the pressure reducer, such as a gap 54 between the rod 50 and the flow guide member 48, a gap 55 between an end shoulder 56 of the stepped bore 38 and the shoulder 51 of the valve tappet 47, and a gap 57 between the shoulder 52 of the stepped bore 38 and the valve seat 45. By means of an appropriate placement of the three springs 43, 49 and 53, and of the three gaps 54, 55 and 57, the switching operation of the pressure reducer 26, 27 can be adapted to the respective requirements of a vehicle-specific, optimum embodiment.

Figure 5:
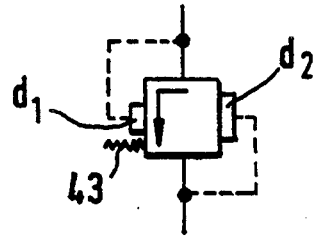
FIGS. 5 and 6 respectively show a symbol for a pressure reducer and, by way of example, the course of pressure attainable with the pressure reducer.
Figure 5:
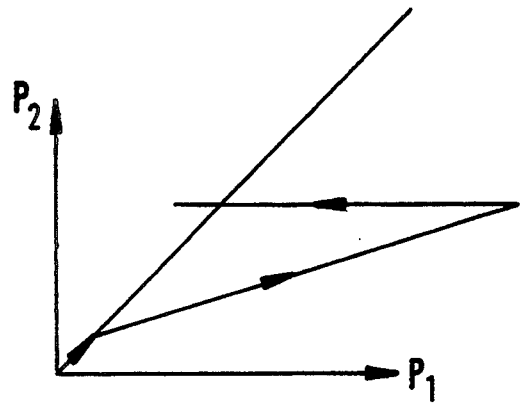
Figure 6:
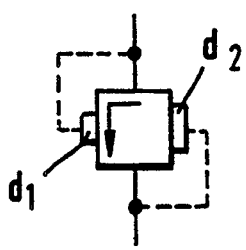
Figure 6:
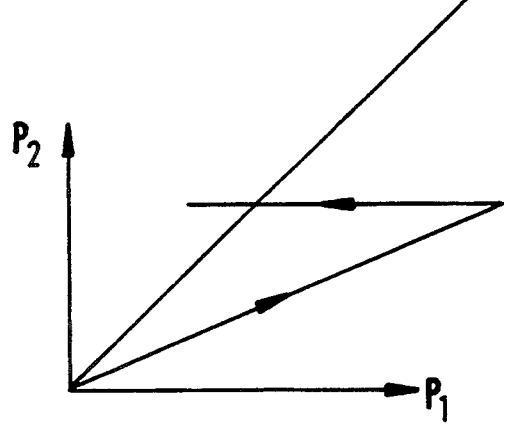

When the spring 43 is omitted, the seat valve 45/46 closes already for the first time at a slight increase in brake pressure p1 coming from the main cylinder 1 (see FIG. 6). When the spring 43 is used, first a specific increase in pressure must occur before the seat valve 45/46 closes for the first time, thus regulating the brake cylinder pressure P2 down (see FIG. 5: use of the spring 43).

Finally, it is noted that a return line 59 that is blocked by a return valve 58 in the direction of pressure buildup, and that permits a drop in the brake cylinder pressure as soon as the brake cylinder pressure is higher than the main cylinder pressure, is disposed between the connection 36 for the brake line leading to the wheel cylinder 10, 11 and the connection 35 on the main cylinder side.

When the anti-lock device, its control device 70 and its electric network are intact, a circuit (not shown) of a stop switch (also not shown) is closed when the pedal is operated, for instance. With the closing of such a circuit, or another circuit, at least one of the two pressure reducers 26, 27 receives current and becomes effective. The main cylinder pressure is supplied at a reduced level to the front-wheel brakes in accordance with the curves shown in FIGS. 5 and 6.

If pedal operation is further intensified, or the vehicle equipped in this manner travels across a section of road with a lower than original traction, then the danger arises that the brakes of the rear axle will lock. A danger of locking of this nature is recognized by the control device 70 of the anti-locking device. This recognition effects a deactivation of at least the one pressure reducer 26, 27, so that this reducer returns to its initial position, in which the brake line throughput to the respective front-wheel brake cylinder is open once more. Now the braking system delivers equal brake pressures to the front and rear, provided that the anti-locking device has not, or not yet, reduced these brake pressures to the front or rear, in accordance with its function.

Figure 2:
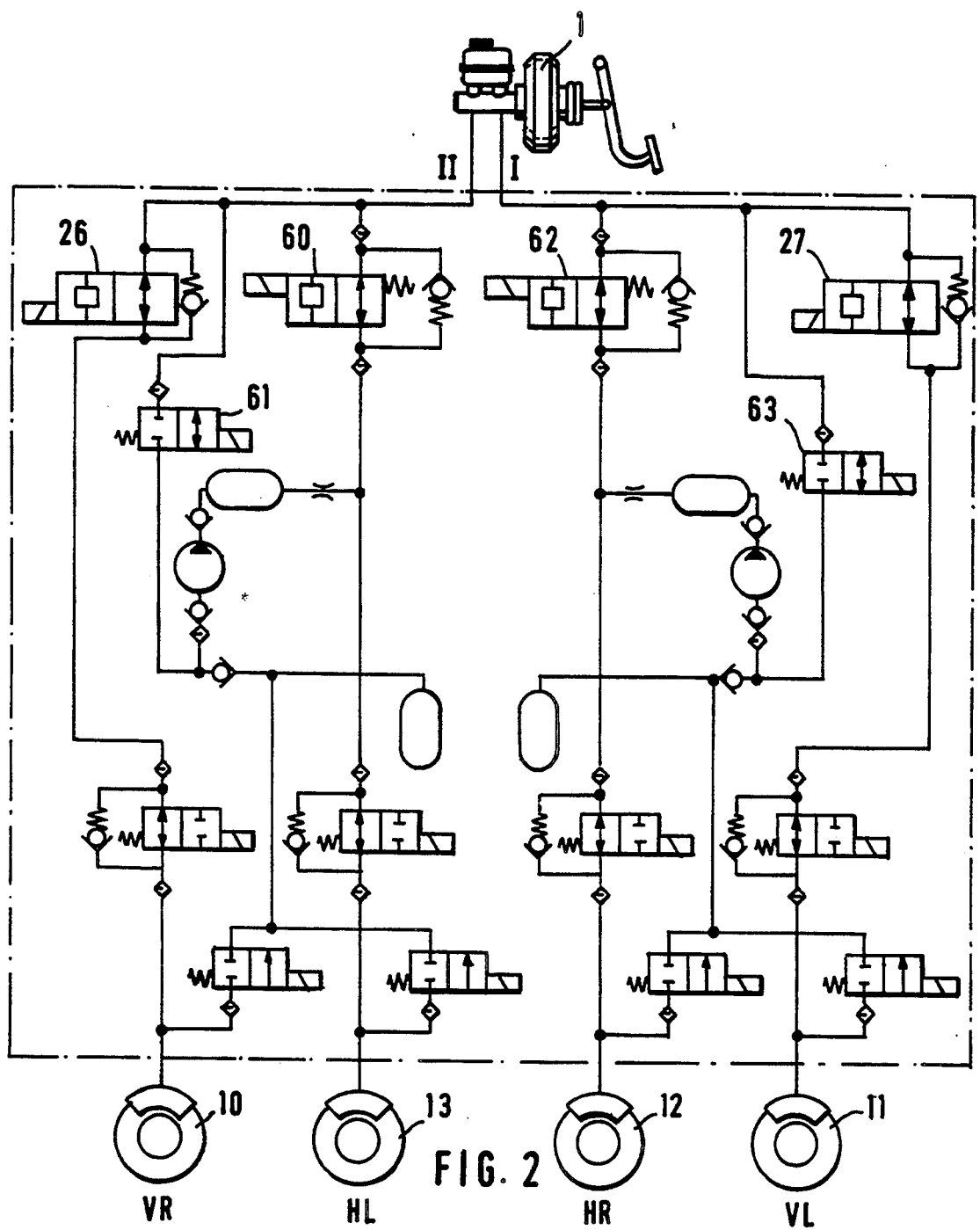
FIG. 2 shows a modification of the exemplary embodiment of FIG. 1 with traction control for the rear axle.

FIG. 2 shows a modification of the dual-circuit braking system of FIG. 1, in that as an exemplary embodiment is shown here that is specific to a vehicle with rear-wheel drive, and is set up for anti-locking operation as well as traction control. For this purpose two 2/2-way magnet valves 61, 63 are installed for each brake circuit. Otherwise, the individual parts of the dual-circuit braking system are identical to those in FIG. 1, and bear the same reference numerals. In both cases the brake circuits I and II are divided diagonally; the mode of operation of the two pressure reducers 26 and 27 is the same. Pressure reducers 60 and 62 can also be provided for the rear wheels. This mode of operation therefore does not need to be explained again.

Figure 3:
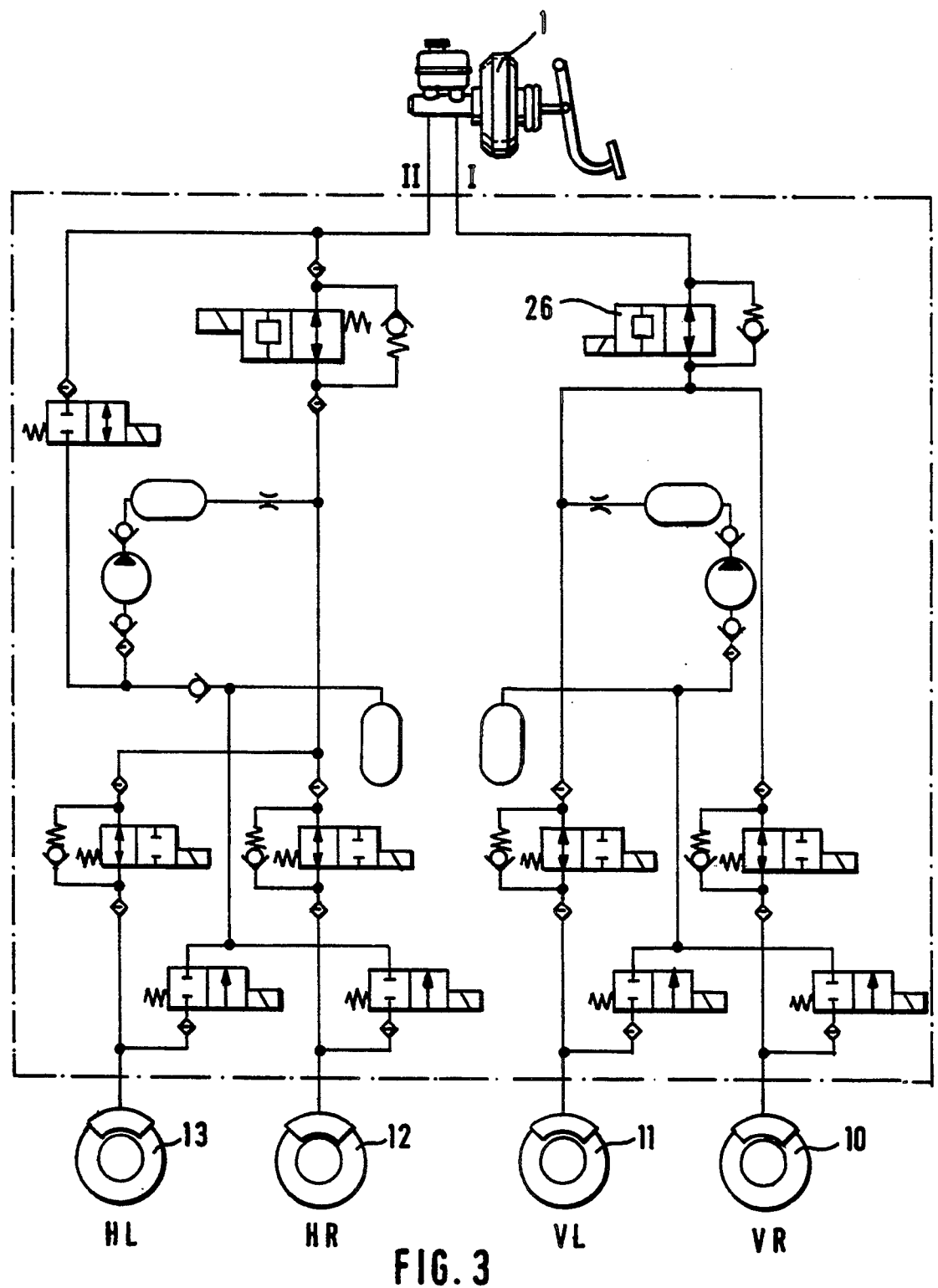
FIG. 3 shows a dual-circuit braking system with traction control for the rear axle.

Finally, FIG. 3 shows a dual-circuit braking system of a vehicle with an anti-locking device (ABS) and rear-wheel drive with traction control (ASR). The brake circuits in this figure are embodied as a front-wheel brake circuit and a rear-wheel brake circuit. Only a single pressure reducer 26 is necessary for both front-wheel brakes. Here, too, the individual parts of the dual-circuit braking system and the mode of operation of the pressure reducer 26 are identical to those in FIGS. 1 and 2.

The foregoing relates to preferred exemplary embodiments of the invention, it being understood that other variants and embodiments thereof are possible within the spirit and scope of the invention, the latter being defined by the appended claims.

What is claimed and desired to be secured by Letter Patent of the United States is:

1. A braking system for motor vehicles, having a main cylinder brake, wheel brake cylinders for at least one front wheel and at least one rear wheel, and having an anti-locking device, which has magnet valves associated with the wheel brake cylinders and a control device that monitors and controls the magnet valves, at least one pressure reducer (26, 27) that can be activated electromagnetically is inserted into at least one brake circuit (I, II); each pressure reducer (26, 27) has two active surfaces (d1, d2) of different sizes for the purpose of affecting wheel brake pressure dependent on the main cylinder brake pressure, in the sense of a reduction of pressure; that a pressure reduction of the brake cylinder pressure effected in this way occurs only at the at least one front wheel (10, 11); and that this pressure reduction can only be activated when the anti-locking device is able to function.

2. The braking system as defined by claim 1, in which the activatable pressure reduction can be executed in accordance with a predetermined characteristic curve.

3. The braking system as defined by claim 2, in which a pressure reducer (26, 27) is inserted at said at least one front wheel.

4. A dual-circuit braking system as defined by claim 2, in which one common pressure reducer (26) is provided for the at least one front wheel.

5. The braking system as defined by claim 2, in which the pressure reducer has an electromagnet with a tension rod (50) that cooperates with a valve tappet (47) on which a closing body (45) for a seat valve (45/46) is disposed, whose valve seat (45) is located on a stepped piston (39) disposed on a same shaft as the rod (50).

6. The braking system as defined by claim 2, in which the pressure reduction predetermined by the active surface relationship of the two active surfaces (d1, d2) of the stepped piston is activated at a start of pressure increase in the front-wheel brake cylinders.

7. The braking system as defined by claim 2, in which the pressure reduction by means of the force of a spring (43) at the start of pressure increase in the main cylinder (1) can be set to a ratio of 1:1 with respect to the pressure increase in the wheel cylinder which, with a further increase in pressure in the main cylinder (1), can be reduced again to the pressure reduction predetermined by the active surface relationship.

8. The braking system as defined by claim 1, in which a pressure reducer (26, 27) is inserted at said at least one front wheel.

9. The braking system as defined by claim 8, in which the pressure reducer has an electromagnet with a tension rod (50) that cooperates with a valve tappet (47) on which a closing body (45) for a seat valve (45/46) is disposed, whose valve seat (45) is located on a stepped piston (39) disposed on a same shaft as the rod (50).

10. The braking system as defined by claim 8, in which the pressure reduction predetermined by the active surface relationship of the two active surfaces (d1, d2) of the stepped piston is activated at a start of pressure increase in the front-wheel brake cylinders.

11. The braking system as defined by claim 8, in which the pressure reduction by means of the force of a spring (43) at the start of pressure increase in the main cylinder (1) can be set to a ratio of 1:1 with respect to the pressure increase in the wheel cylinder which, with a further increase in pressure in the main cylinder (1), can be reduced again to the pressure reduction predetermined by the active surface relationship.

12. A dual-circuit braking system as defined by claim 1, in which one common pressure reducer (26) is provided for the at least one front wheel.

13. The braking system as defined by claim 1, in which the pressure reducer has an electromagnet with a tension rod (50) that cooperates with a valve tappet (47) on which a closing body (45) for a seat valve (45/46) is disposed, whose valve seat (45) is located on a stepped piston (39) disposed on a same shaft as the rod (50).

14. The braking system as defined by claim 13, in which a smaller active surface (d1) of the stepped piston (39) is subjected to the pressure from the main cylinder (1), and a larger active surface (d2) is subjected to the wheel cylinder pressure.

15. The braking system as defined by claim 14, in which the stepped piston (39) has a coaxial bore with a discharge opening that forms the valve seat (45) on the smaller active surface (d1) subjected to the main cylinder pressure.

16. The braking system as defined by claim 13, in which the valve seat (45) is a separate part inserted into the stepped piston (39).

17. The braking system as defined by claim 16, in which the stepped piston (39) has a coaxial bore with a discharge opening that forms the valve seat (45) on the smaller active surface (d1) subjected to the main cylinder pressure.

18. The braking system as defined by claim 13, in which the stepped piston (39) has a coaxial bore with a discharge opening that forms the valve seat (45) on the smaller active surface (d1) subjected to the main cylinder pressure.

19. The braking system as defined by claim 1, in which the pressure reduction predetermined by the active surface relationship of the two active surfaces (d1, d2) of the stepped piston is activated at a start of pressure increase in the front-wheel brake cylinders.

20. The braking system as defined by claim 1, in which the pressure reduction is produced by means of the force of a spring (43) at the start of pressure increase in the main cylinder (1) can be set to a ratio of 1:1 with respect to the pressure increase in the wheel cylinder which, with a further increase in pressure in the main cylinder (1), can be reduced again to the pressure reduction predetermined by the active surface relationship.

* * * * *